United States Patent
Wu et al.

(10) Patent No.: US 9,321,907 B2
(45) Date of Patent: Apr. 26, 2016

(54) PROCESS FOR PREPARATION OF STABLE FATTY ALCOHOL EMULSION

(75) Inventors: Fei Wu, Nanjing (CN); Tian Cao, Nanjing (CN); Yang Liu, Nanjing (CN); Wei Huang, Nanjing (CN); Ying Xin Sun, Nanjing (CN)

(73) Assignee: NANJING SIXIN SCIENTIFIC-TECHNOLOGICAL APPLICATION RESEARCH INSTITUTE CO. LTD. (CN)

( * ) Notice: Subject to any disclaimer, the term of this patent is extended or adjusted under 35 U.S.C. 154(b) by 0 days.

(21) Appl. No.: 13/990,768

(22) PCT Filed: Jun. 4, 2012

(86) PCT No.: PCT/CN2012/076434
§ 371 (c)(1),
(2), (4) Date: May 30, 2013

(87) PCT Pub. No.: WO2013/143227
PCT Pub. Date: Oct. 3, 2013

(65) Prior Publication Data
US 2015/0025182 A1    Jan. 22, 2015

Related U.S. Application Data

(63) Continuation-in-part of application No. PCT/CN2012/076434, filed on Jun. 4, 2012.

(30) Foreign Application Priority Data

Mar. 29, 2012  (CN) .......................... 2012 1 0086168

(51) Int. Cl.
 *C08K 13/00* (2006.01)
 *D21H 21/12* (2006.01)
 *B01D 19/04* (2006.01)
 *D21H 17/00* (2006.01)

(52) U.S. Cl.
 CPC ............ *C08K 13/00* (2013.01); *B01D 19/0404* (2013.01); *D21H 17/72* (2013.01); *D21H 21/12* (2013.01)

(58) Field of Classification Search
 CPC .... B01D 19/0404; C08K 13/00; D21H 17/72; D21H 21/12
 See application file for complete search history.

(56) References Cited

U.S. PATENT DOCUMENTS

| | | | |
|---|---|---|---|
| 4,009,119 A | 2/1977 | Poschmann et al. | 252/358 |
| 4,664,844 A | 5/1987 | Bergold et al. | 252/358 |
| 4,950,420 A | 8/1990 | Svarz | 252/321 |
| 5,326,499 A | 7/1994 | Wegner et al. | 252/321 |
| 5,744,066 A | 4/1998 | Oppenlander et al. | 252/358 |
| 5,807,502 A | 9/1998 | Wollenweber et al. | 252/321 |

FOREIGN PATENT DOCUMENTS

| | | | |
|---|---|---|---|
| CN | 102242523 | * 11/2011 | |
| DE | 3001387 | 7/1981 | ............ B01D 19/04 |
| EP | 0531713 | 3/1993 | ............ B01F 17/00 |
| EP | 0732134 | 9/1996 | ............ B01D 19/04 |
| JP | 2003-164707 | * 10/2003 | |

* cited by examiner

Primary Examiner — Robert Jones, Jr.
(74) Attorney, Agent, or Firm — Hayes Soloway P.C.

(57) ABSTRACT

Described is a method for preparation of stable fatty alcohol emulsion, wherein, fatty acid esters are introduced into an antifoaming agent emulsion system, and an anionic surfactant is added in the late stage of emulsification process in order to further improve the stability of the emulsion. The anionic surfactant is absorbed to the surface of fatty alcohol particles to make the fatty alcohol emulsion more stable under the action of ionic mutual repulsion. The prepared fatty alcohol emulsion has favorable foam elimination and suppression performance in the paper making procedure, and is stable during storage.

7 Claims, No Drawings

PROCESS FOR PREPARATION OF STABLE FATTY ALCOHOL EMULSION

CROSS REFERENCE TO RELATED APPLICATIONS

This application is a continuation-in-part of PCT/CN2012/076434, filed Jun. 4, 2012, which claims benefit of CN201210086168.X, filed Mar. 29, 2012, the entire disclosure of which is incorporated herein by reference.

FIELD OF THE INVENTION

The present invention relates to a process for preparation of fatty alcohol emulsion antifoaming agent for paper making, which belongs to the technical field of fine chemicals.

BACKGROUND OF THE INVENTION

The paper making process in paper industry usually comprises pulping, papermaking, and coating. Most types of plant fibers in the raw materials for pulping contain hydroxyl radical, which tend to absorb a large number of tiny foams that are difficult to remove with conventional antifoaming agents on their surfaces and in them; especially, since higher requirements for the quality of paper are put forth today and the operating speed of the paper machine improves continually, a variety of macromolecule additives have to be added in order to improve the quality of products; however, the use of these additives makes the foams produced during agitation and absorbed to fine fibers more stable. If these foams are not eliminated, the paper quality will be degraded, and paper breaking may occur in the paper machine, causing reduced yield and adverse effect on the benefits of the producer. In addition, antifoaming agents are helpful for fiber retaining and filtering, and thereby can reduce fiber loss and avoid water waste, and improve the recovery rate of pulp, attaining considerable economic benefits. Therefore, it is especially important to use antifoaming agents in the paper making procedure.

Existing high-performance antifoaming agents for paper marking are usually fatty alcohol antifoaming agents, with fatty alcohol as the main active ingredient. These antifoaming agents can form oil-in-water emulsion by means of an emulsification process. For example, U.S. Pat. No. 5,807,502 describes an emulsion antifoaming agent constituted by $C_{10}$~$C_{28}$ fatty alcohols, anionic surfactant, and addition product of oxirane and $C_6$~$C_{18}$ fatty alcohols, and the viscosity of emulsion prepared by the method described in this document will increase as time goes on; U.S. Pat. No. 4,009,119 discloses an aqueous antifoaming agent composed of long carbon-chain fatty alcohols, fatty acids, dihydric alcohol esters or trihydric alcohol esters of fatty acids, and liquid paraffin; U.S. Pat. No. 4,664,844 discloses an antifoaming agent constituted of $C_{12}$~$C_{26}$ fatty alcohols, $C_{12}$~$C_{22}$ fatty acids, and esters of $C_{12}$~$C_{18}$ monohydric to trihydric alcohols, and hydrocarbons with boiling point higher than 200° C. or $C_{12}$~$C_{22}$ fatty acids, wherein, the involved emulsifying agents include amides, alkyl phenols and fatty alcohol polyoxyethylene ethers, and the viscosity is adjusted through a homopolymer or copolymer of acrylic acid and methacrylic acid to keep the antifoaming agent stable; U.S. Pat. No. 4,950,420 discloses an antifoaming agent for paper industry, which contains 10~90% of surface active polyethers, such as polyalkoxylated glycerol or polyalkoxylated sorbitol, and 10~90% of fatty acid esters of polyhydric alcohols, such as monoester and diester of glycol or polypropylene glycol; DE3001387 describes an oil-in-water aqueous emulsion, which is constituted of fatty alcohols with relatively high melting point and hydrocarbons that are in liquid state at room temperature, and the oil phase component can comprise non-aromatic hydrocarbons fatty acids or fatty esters, bee wax, carnauba wax, Japan wax, and Montan wax with relatively high melting point; EP0531713 describes an oil-in-water antifoaming agent, with the oil phase component comprising esters condensed from fatty alcohols with at least 12 carbon atoms, alcohols with at least 22 carbon atoms, and fatty acids with 1~36 carbon atoms, or esters condensed from fatty alcohols with 12~22 carbon atoms and monohydric to trihydric fatty acids with 1~18 carbon atoms, or hydrocarbons with boiling point higher than 200° C., or esters condensed from fatty acids with 12~22 carbon atoms and polyglycerol, and such emulsion has to be prepared with water soluble emulsifying agents; EP0732134 discloses an oil-in-water emulsion antifoaming agent applied in bubbly aqueous media, with the oil phase component comprising distillation residue of at least a type of higher alcohol that contains more than 12 carbon atoms and is prepared through an oxo-synthesis or Ziegler process, and esters condensed at least 1:1 in mol ratio from sugar alcohol with at least 4 hydroxyl radicals or at least 2 hydroxyl radicals and an intramolecular ether bond and fatty acids with at least 20 carbon atoms, wherein, the residual hydroxyl radicals in the esters can be esterified partially or wholly by fatty acids with 12~18 carbon atoms, and the oil phase component of the antifoaming agent can further comprise esters condensed from alcohols with at least 22 carbon atoms and fatty acids with 1~36 carbon atoms, polyethylene wax, natural wax, and hydrocarbons with boiling point higher than 200° C. or fatty acids with 12~22 carbon atoms.

It is known from existing patent documents and the information of commercial antifoaming agents that fatty alcohol emulsion antifoaming agents inevitably have problems related with storage stability, i.e., the viscosity of emulsion will increase gradually as the time goes; especially, at low temperature, the emulsion may even turn to solid, therefore loses its liquidity in application. Through numerous tests, the inventor introduces fatty acid esters into the antifoaming agent emulsion system, and adds an anionic surfactant in the late stage of emulsification process, so that the anionic surfactant is absorbed on the surface of fatty alcohol and to make the fatty alcohol emulsion more stable under the action of ionic mutual repulsion.

SUMMARY OF THE INVENTION

The present invention employs the following technical scheme to solve the technical problem of stability of fatty alcohol emulsion: Through numerous tests, the inventor introduces fatty acid esters into the antifoaming agent emulsion system, and adds an anionic surfactant in the late stage of emulsification process, so that the anionic surfactant is absorbed on the surface of fatty alcohol to make the fatty alcohol emulsion more stable under the action of ionic mutual repulsion.

Said fatty alcohol emulsion comprises the following components:

1. Fatty Alcohols

The fatty alcohols in the antifoaming agent according to the present invention are $C_{12\text{-}30}$ monohydric to trihydric alcohols. These alcohols include natural and synthesized fatty alcohols. Specifically, said fatty alcohols are selected from the group consisted of $C_8$ alcohol, $C_{10}$ alcohol, $C_{12}$ alcohol, $C_{14}$ alcohol, $C_{16}$ alcohol, $C_{18}$ alcohol, $C_{20}$ alcohol, $C_{22}$ alcohol, $C_{24}$ alcohol, $C_{26}$ alcohol, $C_{28}$ alcohol, $C_{30}$ alcohol, which have a single carbon atom number respectively; or, the fatty alcohols can be selected from mixed fatty alcohols that have different numbers of carbon atoms, such as $C_8$-$C_{10}$ alcohols, $C_8$-$C_{14}$ alcohols, $C_8$-$C_{18}$ alcohols, $C_{12}$-$C_{14}$ alcohols, $C_{12}$-$C_{18}$ alcohols, $C_{14}$-$C_{16}$ alcohols, and $C_{16}$-$C_{18}$ alcohols; if synthetic alcohols are to be used, the fatty alcohols can be obtained from alkyl aluminum oxide through a Ziegler process, and also can be obtained by carbonyl synthesis. Usually, fatty alcohols obtained through such a process are mixed and saturated straight chain alcohols. The amount of fatty alcohols is 15-25% of total mass of the fatty alcohol emulsion 2. Organic Hydrocarbons The organic hydrocarbons according to the present invention are formed by carbon hydrogen bonds, with boiling point higher than 200° C.; they can be straight or branched chain structures, and also can contain a few of ring structures. The organic hydrocarbons are selected from the group consisted of diesel oil, engine oil, kerosene, white oil, liquid wax, paraffin, microcrystalline wax and alkylbenzene, and can be one or a mixture of more of these substances. The amount of organic hydrocarbons is 3~8% of total mass of the fatty alcohol emulsion.

3. Fatty Acid Esters

The fatty acid esters according to the present invention include monohydric alcohol fatty acid esters and polyhydric alcohol fatty acid esters. The fatty acids used for synthesizing the esters are $C_{12-22}$ saturated alkyl fatty acids, such as lauric acid, myristic acid, palmitic acid, stearic acid, arachidic acid, and docosanoic acid. The alcohols used in the esterification process are $C_1$~$C_{18}$ saturated alcohols, wherein, monohydric alcohols are selected from the group consisted of methyl alcohol, ethyl alcohol, propyl alcohol, butyl alcohol, hexyl alcohol, decyl alcohol, and stearyl alcohol; the polyhydric alcohols are saturated alcohols that contains 2~6 hydroxyl radicals, such as ethylene glycol, diethylene glycol, propylene glycol, glycerol, di-polyglycerol, trimethylolethane, trimethylolpropane, trimethylolbutane, pentaerythritol or di-pentaerythritol, and polyglycerol. The polyhydric alcohols can be esterified completely or partially to form monoesters or polyesters. The amount of fatty acid esters is 2~6% of total mass of the fatty alcohol emulsion.

4. Emulsifying Agent

The emulsifying agent according to the present invention includes non-ionic surfactant and anionic surfactant, which can be used separately or in mixture. The structural formula is:

$$R[O(EO)_aH]_b$$

Wherein, R is straight or branched chain alkyl with 1~30 carbon atoms, a is degree of polymerization (an integer within a range of 1~60), and b is 1, 2 or 3.

The molecular weight of the polyethers is 1000~3000. The amount of non-ionic surfactant is 0.01~10% of total mass of the fatty alcohol emulsion.

The anionic surfactant includes (but not limited to) carboxylate, sulfate, and phosphate. Specifically, the anionic surfactant includes dodecyl polyoxyethylene ether sodium sulfate, sodium dodecyl sulfate, sodium dodecyl benzene sulfonate, sodium dodecyl sulfate, sodium hexadecyl sulfate, sodium hexadecyl benzene sulfonate, and dodecyl diphenyl ether sodium disulfonate.

The anionic surfactant is used in two parts in the emulsion preparation process, denoted as Y1 and Y2; the two parts of anionic surfactant can be identical or different.

The amount of anionic surfactant Y1 is 0.01~5% of total mass of the fatty alcohol emulsion.

The amount of anionic surfactant Y2 is 0.01~5% of total mass of the fatty alcohol emulsion.

5. Thickening Agent

The thickening agent according to the present invention is mainly used to adjust the viscosity of the emulsion, so as to improve the stability of the emulsion. The thickening agent includes xanthan gum, guar gum, polyvinyl alcohol, sodium carboxymethyl cellulose, hydroxyethyl cellulose, polyacrylic acid, polyacryl amide, and polyacrylates. The thickening agent is preferably polyacrylic acid, and the amount of the thickening agent is 1~3% of total mass of the fatty alcohol emulsion.

6. Deionized Water

The amount of water determines the solid content in the final product. In the present invention, the amount of water is 60~75% of total mass of the fatty alcohol emulsion.

A process for preparation of fatty alcohol emulsion antifoaming agent for paper making, mainly utilizing an "agent-in-oil" method, comprising the following steps:

(1) adding fatty alcohols, organic hydrocarbons, fatty acid esters, non-ionic surfactant, and Y1 part of anionic surfactant into a reactor proportionally, heating up to 70-95° C. and keeping at the temperature for 1 h while agitating to facilitate homogeneous mixing;

(2) adding 70-95° C. deionized water into the mixture slowly;

(3) further emulsifying the mixture in a high-shear emulsifying device, adding Y2 part of anionic surfactant at 70-85° C., keeping at the temperature and agitating for 20 minutes;

(4) cooling down the mixture to room temperature, and then adding thickening agent, so as to obtain the fatty alcohol antifoaming agent for paper making.

EMBODIMENTS

Embodiment 1

Add 12 g of $C_{16}$ alcohol, 6 g of $C_{18}$ alcohol, 6 g of white oil, 3 g of diethylene glycol monolaurate, 1 g of fatty alcohol polyoxyethylene ether ($C_{12}H_{25}O(EO)_{60}H$), and 1 g of sodium dodecyl sulfate into a reactor, mix and heat up to 90° C., agitate to homogeneous state, and then add 70 g of water at 75° C., treat in a high-speed shearing device to obtain emulsion, add 1 g of sodium dodecyl sulfate to the emulsion, cool down the mixture and then add 1.2 g of polyacrylic acid thickening agent to adjust the viscosity to 324 mPa·s, so as to obtain fatty alcohol emulsion antifoaming agent A.

Embodiment 2

Add 22 g of $C_{22}$ alcohol, 3 g of paraffin, 6 g of glyceryl monostearate, 2 g of fatty alcohol polyoxyethylene ether ($C_8H_{17}O(EO)_{15}H$), and 0.5 g of sodium dodecyl benzene sulfonate into a reactor, mix and heat up to 70° C., agitate to homogeneous state, and then add 66 g of water at 95° C., treat in a high-speed shearing device to obtain emulsion, add 0.5 g of sodium dodecyl sulfate to the emulsion, cool down the mixture and then add 1.5 g of polyacrylic acid thickening agent to adjust the viscosity to 335 mPa·s, so as to obtain fatty alcohol emulsion antifoaming agent B.

Embodiment 3

Add 10 g of $C_{18}$ alcohol, 5 g of $C_{28}$ alcohol, 8 g of white oil, 3 g of glycerol tribehenate, 0.5 g of fatty alcohol polyoxyethylene ether ($C_{10}H_{21}O(EO)_{40}H$), and 1 g of dodecyl diphenyl ether sodium disulfonate into a reactor, mix and heat up to 80° C., agitate to homogeneous state, and then add 71 g of water at 75° C., treat in a high-speed shearing device to obtain emulsion, add 1.5 g of sodium dodecyl benzene sulfonate to the emulsion, cool down the mixture and then add 2.0 g of polyacrylic acid thickening agent to adjust the viscosity to 360 mPa·s, so as to obtain fatty alcohol emulsion antifoaming agent C.

Embodiment 4

Add 20 g of $C_{20}$ alcohol, 8 g of microcrystalline wax, 3 g of pentaerythritol monostearate, 2 g of fatty alcohol polyoxyethylene ether ($C_{14}H_{29}O(EO)_{20}H$), and 2 g of sodium hexadecyl sulfate into a reactor, mix and heat up to 85° C., agitate to homogeneous state, and then add 63 g of water at 85° C., treat in a high-speed shearing device to obtain emulsion, add 2 g of dodecyl polyoxyethylene ether sodium sulfate to the emulsion, cool down the mixture and then add 2.8 g of polyacrylic acid thickening agent to adjust the viscosity to 380 mPa·s, so as to obtain fatty alcohol emulsion antifoaming agent D.

Embodiment 5

Add 14 g of $C_{14}$ alcohol, 1 g of $C_{28}$ alcohol, 3 g of paraffin, 2 g of dipolyglycerol myristinate, 2 g of fatty alcohol polyoxyethylene ether ($C_{12}H_{25}O(EO)_{40}H$), and 1.5 g of sodium dodecyl sulfate into a reactor, mix and heat up to 90° C., agitate to homogeneous state, and then add 75 g of water at 80° C., treat in a high-speed shearing device to obtain emulsion, add 1.5 g of dodecyl diphenyl ether sodium disulfonate to the emulsion, cool down the mixture and then add 2.4 g of polyacrylic acid thickening agent to adjust the viscosity to 371 mPa·s, so as to obtain fatty alcohol emulsion antifoaming agent E.

Embodiment 6

Add 16 g of $C_{20}$ alcohol, 4 g of C alcohol, 3 g of microcrystalline wax, 2 g of trimethylolpropane monostearate, 1 g of fatty alcohol polyoxyethylene ether ($C_8H_{17}O(EO)_{50}H$), and 1 g of sodium hexadecyl sulfate into a reactor, mix and heat up to 85° C., agitate to homogeneous state, and then add 72 g of water at 75° C., treat in a high-speed shearing device to obtain emulsion, add 1 g of sodium hexadecyl benzene sulfonate to the emulsion, cool down the mixture and then add 2.8 g of polyacrylic acid thickening agent to adjust the viscosity to 390 mPa·s, so as to obtain fatty alcohol emulsion antifoaming agent F.

Comparative Embodiment 1

Add 17 g of $C_{16}$ alcohol, 6 g of $C_{24}$ alcohol, 6 g of white oil, 3 g of di-pentaerythritol monolaurate, 2 g of fatty alcohol polyoxyethylene ether ($C_{12}H_{25}O(EO)_{30}H$), and 2 g of sodium dodecyl sulfate into a reactor, mix and heat up to 90° C., agitate to homogeneous state, and then add 64 g of water at 85° C., treat in a high-speed shearing device to obtain emulsion, cool down the mixture and then add 1.2 g of polyacrylic acid thickening agent to adjust the viscosity to 322 mPa·s, so as to obtain fatty alcohol emulsion antifoaming agent G.

Comparative Embodiment 2

Add 15 g of $C_{20}$ alcohol, 6 g of paraffin, 2 g of diethylene glycol monostearate, 1 g of fatty alcohol polyoxyethylene ether ($C_8H_{17}O(EO)_{60}H$), and 1 g of sodium hexadecyl benzene sulfonate into a reactor, mix and heat up to 85° C., agitate to homogeneous state, and then add 75 g of water at 95° C., treat in a high-speed shearing device to obtain emulsion, cool down the mixture and then add 2.0 g of polyacrylic acid thickening agent to adjust the viscosity to 341 mPa·s, so as to obtain fatty alcohol emulsion antifoaming agent H.

Comparative Embodiment 3

Add 10 g of $C_{18}$ alcohol, 16 g of $C_{22}$ alcohol, 8 g of microcrystalline wax, 2 g of fatty alcohol polyoxyethylene ether ($C_{10}H_{21}O(EO)_{20}H$), and 1 g of dodecyl diphenyl ether sodium disulfonate into a reactor, mix and heat up to 80° C., agitate to homogeneous state, and then add 60 g of water at 75° C., treat in a high-speed shearing device to obtain emulsion, add 3 g of dodecyl diphenyl ether sodium disulfonate to the emulsion, cool down the mixture and then add 2.6 g of polyacrylic acid thickening agent to adjust the viscosity to 359 mPa·s, so as to obtain fatty alcohol emulsion antifoaming agent I.

Comparative Embodiment 4

Add 22 g of $C_{22}$ alcohol, 5 g of white oil, 1 g of fatty alcohol polyoxyethylene ether ($C_{14}H_{29}O(EO)_{60}H$), and 1 g of sodium dodecyl sulfate into a reactor, mix and heat up to 95° C., agitate to homogeneous state, and then add 70 g of water at 95° C., treat in a high-speed shearing device to obtain emulsion, add 1 g of sodium dodecyl benzene sulfonate to the emulsion, cool down the mixture and then add 2.5 g of polyacrylic acid thickening agent to adjust the viscosity to 361 mPa·s, so as to obtain fatty alcohol emulsion antifoaming agent J.

Performance Test

The foam elimination and suppression performance and stability of the antifoaming agents in the embodiments and comparative embodiments are tested with the following method.

1. Perform viscosity test for the antifoaming agents in the embodiments and comparative embodiments with the following method:

Use a NDJ-8 viscosity tester, and test under the condition of 2# rotor and 6 rpm. In that test mode, the measurement range is 0~5000 mPa·s, and any measured value beyond that range is denoted as "-". Measure the viscosity change of the emulsion after it is stored at 0° C., 10° C., 20° C., 30° C., and 40° C. for 90/180 days, respectively. The test results are shown in Table 1:

TABLE 1

Comparison of Stability of Fatty Alcohol Emulsion under Different Storage Conditions

| Test Condition | | A | B | C | D | E | F | G | H | I | J |
|---|---|---|---|---|---|---|---|---|---|---|---|
| Storage Condition | Initial Viscosity | 324 | 335 | 360 | 380 | 371 | 390 | 322 | 341 | 359 | 361 |
| 0° C. | 90 days | 647 | 570 | 612 | 700 | 580 | 496 | 2569 | 2846 | 2884 | 3449 |
| | 180 days | 815 | 777 | 940 | 874 | 749 | 722 | — | — | — | — |
| 10° C. | 90 days | 577 | 449 | 500 | 540 | 520 | 468 | 1921 | 2231 | 2642 | 2840 |
| | 180 days | 748 | 678 | 741 | 691 | 800 | 589 | 4127 | 4715 | — | — |
| 20° C. | 90 days | 500 | 422 | 344 | 386 | 411 | 317 | 1247 | 1860 | 2331 | 2468 |
| | 180 days | 689 | 745 | 610 | 643 | 599 | 673 | 3792 | 3594 | — | — |
| 30° C. | 90 days | 350 | 315 | 290 | 260 | 307 | 290 | 1369 | 1548 | 1964 | 2123 |
| | 180 days | 555 | 568 | 549 | 468 | 471 | 490 | 4741 | 3777 | 4780 | 4911 |
| 40° C. | 90 days | 280 | 250 | 189 | 200 | 279 | 240 | 2687 | 1689 | 1480 | 2654 |
| | 180 days | 478 | 468 | 477 | 397 | 512 | 500 | — | — | 3946 | — |

It can be seen from Table 1, the emulsion prepared with the method according to the present invention has superior storage stability, and the viscosity changes under different storage temperature conditions in 6 months are very small.

2. Test of foam elimination and suppression performance

Add 500 ml white water from newsprint paper making process into a cylindrical glass container with 50 mm inner diameter, 1000 ml capacity, and scale marks, control the white water to flow through a constant-flow circulating pump and fall from a height higher than 50 cm above the liquid level in the cylindrical container to circulate at 40° C. In the test, drive the white water to generate foam by means of circular bubbling, added a specific amount of antifoaming agent sample when the foam volume reaches to 300 ml, and begin to record the change of foam volume with time at the same time. The test results are shown in Table 2:

TABLE 2

Test of Foam Elimination and Suppression Performance at 40° C.

| Time/s | Foam Volume/ml | | | | | | | | | |
|---|---|---|---|---|---|---|---|---|---|---|
| | A | B | C | D | E | F | G | H | I | J |
| 0 | 300 | 300 | 300 | 300 | 300 | 300 | 300 | 300 | 300 | 300 |
| 5 | 90 | 100 | 90 | 100 | 90 | 90 | 100 | 110 | 100 | 100 |
| 10 | 90 | 90 | 90 | 100 | 90 | 90 | 90 | 90 | 90 | 120 |
| 15 | 90 | 100 | 90 | 120 | 100 | 110 | 100 | 100 | 110 | 150 |
| 30 | 100 | 110 | 100 | 130 | 100 | 130 | 120 | 110 | 120 | 150 |
| 60 | 110 | 110 | 110 | 140 | 110 | 150 | 130 | 130 | 150 | 160 |
| 90 | 110 | 140 | 130 | 150 | 120 | 150 | 150 | 130 | 180 | 180 |
| 120 | 120 | 150 | 140 | 160 | 130 | 170 | 170 | 160 | 200 | 200 |
| 150 | 130 | 160 | 150 | 170 | 140 | 180 | 190 | 200 | 220 | 220 |
| 180 | 140 | 170 | 160 | 180 | 150 | 160 | 200 | 250 | 240 | 240 |
| 210 | 150 | 180 | 170 | 190 | 160 | 180 | 240 | 300 | 260 | 260 |
| 240 | 160 | 200 | 170 | 200 | 170 | 200 | 290 | — | 270 | 280 |
| 270 | 170 | 220 | 180 | 190 | 190 | 220 | 300 | — | 280 | 300 |
| 300 | 180 | 240 | 190 | 200 | 200 | 220 | — | — | 290 | — |
| 330 | 190 | 250 | 200 | 200 | 210 | 230 | — | — | 300 | — |
| 360 | 200 | 260 | 220 | 210 | 230 | 240 | — | — | — | — |

In the same duration, smaller foam volume indicates better foam elimination and suppression performance. It can be seen from Table 2, the foam volumes of the antifoaming agents prepared with the method according to the present invention are small in the test, and the antifoaming agents exhibit favorable foam elimination and suppression effect.

The invention claimed is:

1. A process for preparation of a stable fatty alcohol emulsion, wherein, said fatty alcohol emulsion comprises the following components:
   (A) a fatty alcohol comprising a $C_{12-30}$ monohydric to trihydric alcohol, or a mixture of alcohols with different numbers of carbon atoms, in an amount which is 15 to 25% of the total mass of the fatty alcohol emulsion;
   (B) an organic hydrocarbon in an amount which is 3 to 8% of the total mass of the fatty alcohol emulsion;
   (C) a monohydric orpolyhydric alcohol ester of a $C_{12-22}$ saturated alkyl fatty acid or of a $C_{1-18}$ saturated fatty acid, in an amount which is 2 to 6% of the total mass of the fatty alcohol emulsion;
   (D) a non-ionic surfactant and an anionic surfactant, which are used separately or in mixture; wherein, the anionic surfactant is added in two addition steps I and II, and wherein the anionic surfactants added in the two addition steps, I and II can be identical or different;
   (E) a thickening agent in an amount which is 1 to 3% of the total mass of the fatty alcohol emulsion; and
   (F) deionized water in an amount which is 60 to 75% of total mass of the fatty alcohol emulsion;

the process comprising the following steps:
(1) forming a mixture of the fatty alcohol, the organic hydrocarbon, the fatty acid ester, the non-ionic surfactant, and the anionic surfactant in the first addition step I, in a reactor, heating the mixture to 70 to 95° C. and keeping the mixture at this temperature while agitating to facilitate homogeneous mixing;
(2) adding deionized water at 70 to 95° C. into the mixture of step (1);
(3) emulsifying the mixture of step (2) in a high-shear emulsifying device, adding the anionic surfactant in the second step II at 70 to 85° C., keeping at this temperature while agitating the emulsified mixture; and
(4) cooling down the emulsified mixture from step (3) to room temperature, and then adding a thickening agent, so as to obtain the fatty alcohol antifoaming agent for paper making.

2. The process for preparation of a stable fatty alcohol emulsion according to claim 1, wherein, the saturated fatty alcohol comprise monohydric alcohols and polyhydric alcohols that contain 2 to 6 hydroxyl radicals, and the polyhydric alcohols are esterified completely or partially to form monoesters or polyesters.

3. The process for preparation of a stable fatty alcohol emulsion according to claim 1, wherein, the non-ionic surfactant comprises a fatty alcohol polyoxyethylene ether having a molecular weight of 1000 to 3000 and the following structural formula:
where, R is a straight or branched chain alkyl with 1 to 30 carbon atoms, a is the degree of polymerization and is an integer within a range of 1 to 60, and b is 1, 2 or 3.

4. The process for preparation of a stable fatty alcohol emulsion according to claim 1, wherein, the amount of the anionic surfactant added in the first addition step I is 0.01 to 5% of the total mass of the fatty alcohol emulsion, and the amount of the anionic surfactant added in the second addition step II is 0.01 to 5% of the total mass of the fatty alcohol emulsion.

5. The process for preparation of a stable fatty alcohol emulsion according to claim 1, wherein, the amount of the non-ionic surfactant is 0.01 to 10% of the total mass of the fatty alcohol emulsion.

6. The process for preparation of a stable fatty acid alcohol emulsion according to claim 1, wherein the mixture is held at 70 to 95° C. for an hour in step (1).

7. The process for preparation of a stable fatty acid alcohol emulsion according to claim 1, wherein the mixture is held at 70 to 85° C. for 20 minutes in step (3).

* * * * *